(12) United States Patent
Fuller

(10) Patent No.: US 9,567,910 B2
(45) Date of Patent: Feb. 14, 2017

(54) FUEL MANIFOLD AND FUEL INJECTOR ARRANGEMENT FOR A COMBUSTION CHAMBER

(71) Applicant: ROLLS-ROYCE PLC, London (GB)

(72) Inventor: Simon Fuller, Derby (GB)

(73) Assignee: ROLLS-ROYCE PLC, London (GB)

( * ) Notice: Subject to any disclaimer, the term of this patent is extended or adjusted under 35 U.S.C. 154(b) by 407 days.

(21) Appl. No.: 14/313,284

(22) Filed: Jun. 24, 2014

(65) Prior Publication Data

US 2015/0020528 A1 Jan. 22, 2015

(30) Foreign Application Priority Data

Jul. 22, 2013 (GB) .................................. 1313034.9

(51) Int. Cl.
*F02C 7/22* (2006.01)
*F23R 3/28* (2006.01)

(52) U.S. Cl.
CPC .............. *F02C 7/222* (2013.01); *F23R 3/283* (2013.01)

(58) Field of Classification Search
CPC ............ F02C 7/222; F02C 7/22; F23R 3/283; F23R 3/28; F23R 3/50
See application file for complete search history.

(56) References Cited

U.S. PATENT DOCUMENTS

| 2,686,401 A | * | 8/1954 | Newcomb | F02C 7/222 60/739 |
| 3,516,252 A | * | 6/1970 | Beane | F02C 7/222 60/739 |
| 4,862,693 A | * | 9/1989 | Batakis | F23D 23/00 239/145 |
| 5,119,636 A | * | 6/1992 | Batakis | F23R 3/283 60/739 |

(Continued)

FOREIGN PATENT DOCUMENTS

| EP | 1 760 293 A2 | 3/2007 |
| GB | 840529 | 7/1960 |

(Continued)

OTHER PUBLICATIONS

British Search Report issued in British Patent Application No. 1313034.9 on Feb. 21, 2014.

(Continued)

*Primary Examiner* — Phutthiwat Wongwian
*Assistant Examiner* — Rene Ford
(74) *Attorney, Agent, or Firm* — Oliff PLC

(57) ABSTRACT

A fuel manifold and fuel injector arrangement for a gas turbine engine combustion chamber comprises an annular combustion chamber casing arranged around the combustion chamber. A plurality of circumferentially spaced fuel injectors supply fuel into the combustion chamber and a fuel manifold supplies fuel to each of the fuel injectors. The fuel manifold comprises a plurality of flexible fuel pipes and a (Continued)

plurality of T piece connectors. The stem of each connector is mounted on an outer end of a respective one of the fuel feed arms and each flexible fuel pipe interconnects an arm of one connector with an arm of an adjacent connector. Each connector is arranged such that the arms are arranged at angles to the planes containing the axis of the casing and perpendicular to the axis of the casing respectively.

20 Claims, 7 Drawing Sheets

(56) References Cited

U.S. PATENT DOCUMENTS

| | | | | |
|---|---|---|---|---|
| 5,197,288 A * | 3/1993 | Newland | ............... | F02C 7/222 60/734 |
| 5,211,005 A | 5/1993 | Hovnanian | | |
| 5,263,314 A * | 11/1993 | Anderson | ............... | F02C 7/222 137/312 |
| 7,992,390 B2 * | 8/2011 | Patel | ............... | F02C 7/222 60/734 |
| 8,079,220 B2 * | 12/2011 | Haggerty | ............... | F02C 7/222 60/739 |
| 8,713,944 B2 * | 5/2014 | Bleeker | ............... | F02C 7/222 60/739 |
| 8,769,954 B2 * | 7/2014 | Fiebig | ............... | F02C 7/222 60/734 |
| 2010/0071663 A1 | 3/2010 | Patel et al. | | |
| 2013/0152590 A1 * | 6/2013 | Kojovic | ............... | F23R 3/20 60/739 |
| 2015/0020528 A1 * | 1/2015 | Fuller | ............... | F02C 7/222 60/746 |
| 2015/0322862 A1 * | 11/2015 | Fuller | ............... | F02C 7/222 60/739 |

FOREIGN PATENT DOCUMENTS

| | | |
|---|---|---|
| GB | 2462915 A | 3/2010 |
| JP | A-2013-108436 | 6/2013 |

OTHER PUBLICATIONS

Sep. 5, 2014 Search Report issued in European Application No. 14 173 3626.

* cited by examiner

FUEL MANIFOLD AND FUEL INJECTOR ARRANGEMENT FOR A COMBUSTION CHAMBER

FIELD OF THE INVENTION

The present invention relates to an arrangement for supplying fuel to a combustion chamber and in particular to a fuel manifold and fuel injector arrangement for a combustion chamber, more particularly to a fuel manifold and fuel injector arrangement for a gas turbine engine combustion chamber.

BACKGROUND TO THE INVENTION

Currently an annular combustion chamber of a gas turbine engine has a number of fuel injectors arranged to supply fuel into the annular combustion chamber. Each fuel injector includes a fuel feed arm which extends generally radially from the annular combustion chamber and through a corresponding aperture in a combustion chamber casing surrounding the annular combustion chamber. An annular fuel manifold extends circumferentially around the combustion chamber casing and is arranged to supply fuel to each of the fuel injectors. The annular fuel manifold is supported from the combustion chamber casing at a number of circumferentially spaced locations by brackets arranged to prevent vibration of the manifold during operation of the gas turbine engine. Each fuel injector is connected to the annular fuel manifold by an associated fuel supply pipe. Each fuel supply pipe is connected at a first end to a T-connector on the annular fuel manifold and is connected at a second end to a radially outer end of the feed arm of the fuel injector. The fuel supply pipes are rigid and are arranged in a generally S-shaped path from the annular fuel manifold to the fuel injector.

In this arrangement the fuel supply pipes are rigid and delicate and occasionally suffer from denting of the fuel pipes, cracking of welds and consequential leakage of fuel. The rigid fuel supply pipes also suffer from vibrations. In addition the assembling of the manifold, fuel pipes and fuel injectors into a fully interlocking and sealing alignment is time consuming and costly and similarly the repairing or replacing of a fuel injector and/or fuel pipe is costly and time consuming. This arrangement requires many components e.g. fuel pipes, connectors, brackets, fasteners, seals etc.

Therefore the present invention seeks to provide a novel fuel manifold and fuel injector arrangement for a combustion chamber which reduces or overcomes the above mentioned problem.

STATEMENTS OF INVENTION

Accordingly the present invention provides a fuel manifold and fuel injector arrangement for supplying fuel to at least one combustion chamber comprising an annular combustion chamber casing arranged around the at least one combustion chamber, a plurality of circumferentially spaced fuel injectors arranged to supply fuel into the at least one combustion chamber, a fuel manifold arranged to supply fuel to each of the fuel injectors, each fuel injector having a fuel feed arm extending through a corresponding aperture in the annular combustion chamber casing, the fuel manifold comprising a plurality of flexible fuel pipes and a plurality of T piece connectors, each T piece connector comprising a stem and two parallel arms extending in opposite directions from the stem, the stem of each T piece connector being mounted on an outer end of a respective one of the fuel feed arms, each flexible fuel pipe interconnecting an arm of one T piece connector with an arm of an adjacent T piece connector, each T piece connector being arranged such that the arms are arranged at an angle relative to a plane perpendicular to the axis of the annular combustion chamber casing such that the fuel manifold extends around the combustion chamber casing sinusoidally.

Each T piece connector may be arranged such that the arms are arranged at an angle relative to a plane containing the axis of the annular combustion chamber casing and at an angle relative to a plane perpendicular to the axis of the annular combustion chamber casing and adjacent T piece connectors being arranged at opposite angles such that the fuel manifold extends around the combustion chamber casing sinusoidally.

The arms of the T piece connectors may be arranged at an angle of 10° to 90° to the plane perpendicular to the axis of the annular combustion chamber casing. The arms of the T piece connectors may be arranged at an angle of 0° to 80° to the plane containing the axis of the annular combustion chamber casing.

The arms of the T piece connectors may be arranged at an angle of 15° to 75° to the plane perpendicular to the axis of the annular combustion chamber casing. The arms of the T piece connectors may be arranged at an angle of 15° to 75° to the plane containing the axis of the annular combustion chamber casing.

The arms of the T piece connectors may be arranged at an angle of 30° to 60° to the plane perpendicular to the axis of the annular combustion chamber casing. The arms of the T piece connectors may be arranged at an angle of 30° to 60° to the plane containing the axis of the annular combustion chamber casing.

All of the T piece connectors may be arranged such that the arms are arranged at an angle of the same magnitude. Alternatively the T piece connectors may be arranged such that the arms are arranged at angle of different magnitudes.

All of the T piece connectors being arranged such that the arms are arranged at an angle of 45° to the plane containing the axis of the annular combustion chamber casing and at an angle of 45° to the plane perpendicular to the axis of the annular combustion chamber casing.

The parallel arms of the T piece connector may be arranged coaxially.

The at least one combustion chamber may be an annular combustion chamber. The at least one combustion chamber may comprise a plurality of tubular combustion chamber arranged in a tubo-annular arrangement.

The combustion chamber may be a gas turbine engine combustion chamber.

The gas turbine engine may be an aero gas turbine engine, a marine gas turbine engine or an industrial gas turbine engine.

The stem of the T piece connector being circular in cross-section, the fuel feed arm being circular in cross-section and the stem of the T piece connector and the fuel feed arm being arranged coaxially.

The fuel manifold and fuel injector arrangement may comprise two L piece connectors, each L piece connector being arranged at a respective end of the fuel manifold, each L piece connector comprising a stem and an arm extending from the stern, the stem of each L piece connector being mounted on an outer end of a respective one of the fuel feed arms and one of the flexible fuel pipes interconnecting an arm of one T piece connector with an arm of an adjacent L piece connector.

The fuel manifold and fuel injector arrangement may comprise a fuel inlet connector, the fuel inlet connector being interconnected with an arm of a T piece connector.

The fuel inlet connector may be interconnected with an arm of a further T piece connector.

The L piece connectors may be arranged at the upper half of the annular combustion chamber casing.

The fuel inlet connector may be arranged at the lower half of the annular combustion chamber casing.

The fuel injectors may be lean burn fuel injectors, the fuel manifold comprising flexible fuel pipes having two fuel passages and the T piece connectors having two fuel passages. The L piece connectors may have two fuel passages.

The fuel injectors may have a pilot fuel spray nozzle and a main fuel spray nozzle, a pilot fuel prefilmer and a main fuel prefilmer or a pilot fuel spray nozzle and a main fuel prefilmer.

The fuel passages in the fuel pipes may be coaxial and the main fuel flowing through an inner fuel passage.

The present invention also provides a fuel manifold and fuel injector arrangement for supplying fuel to at least one combustion chamber comprising an annular combustion chamber casing arranged around the at least one combustion chamber, a plurality of circumferentially spaced fuel injectors arranged to supply fuel into the at least one combustion chamber, a fuel manifold arranged to supply fuel to each of the fuel injectors, each fuel injector having a fuel feed arm extending through a corresponding aperture in the annular combustion chamber casing, the fuel manifold comprising a plurality of flexible fuel pipes and a plurality of T piece connectors, each T piece connector comprising a stem and two parallel arms extending in opposite directions from the stem, the stem of each T piece connector being mounted on an outer end of a respective one of the fuel feed arms, each flexible fuel pipe interconnecting an arm of one T piece connector with an arm of an adjacent T piece connector, each T piece connector being arranged such that the arms are arranged at an angle relative to a plane containing the axis of the annular combustion chamber casing and at an angle relative to a plane perpendicular to the axis of the annular combustion chamber casing and adjacent T piece connectors being arranged at opposite angles such that the fuel manifold extends around the combustion chamber casing sinusoidally.

BRIEF DESCRIPTION OF THE DRAWINGS

The present invention will be more fully described by way of example with reference to the accompanying drawings, in which:—

DETAILED DESCRIPTION

Figure 1:
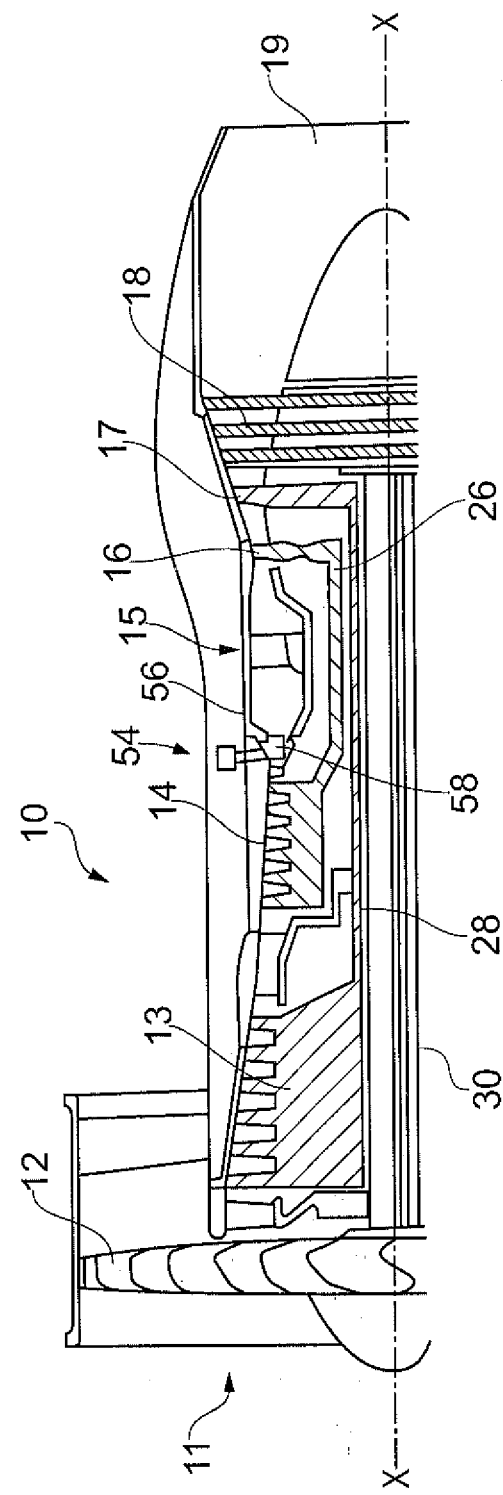
FIG. 1 is partially cut away view of a turbofan gas turbine engine having a fuel manifold and fuel injector arrangement for a combustion chamber according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19: The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
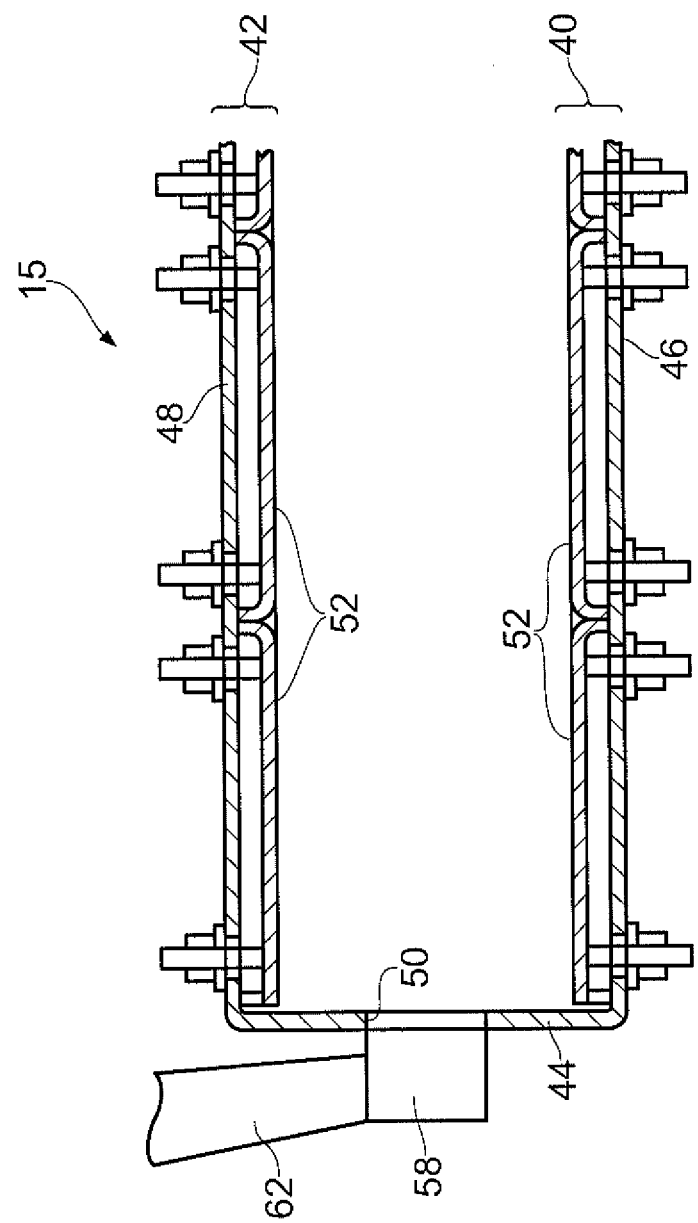
FIG. 2 is an enlarged cross-sectional view through the combustion chamber shown in FIG. 1.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46. The radially outer annular wall structure 42 comprises a second annular wall 48. The upstream end of the first annular wall 46 is secured to the upstream end wall structure 44 and the upstream end of the second annular wall 48 is secured to the upstream end wall structure 44. In this example the radially inner annular wall structure 40 also comprises a number of tiles 52 secured to the first annular wall 46 and the radially outer annular wall structure 42 also comprises a number of tiles 52 secured to the second annular wall 48. The upstream end wall structure 44 has a plurality of circumferentially spaced apertures 50 and each aperture 50 has a respective one of a plurality of fuel injectors 58 located therein. The fuel injectors 58 are arranged to supply fuel into the annular combustion chamber 15 during operation of the gas turbine engine 10.

A fuel manifold and fuel injector arrangement 54 for a combustion chamber 15 according to the present invention is shown more clearly in FIGS. 3 to 11. The combustion chamber 15 is an annular combustion chamber and an annular combustion chamber casing 56 is arranged generally coaxially around the annular combustion chamber 15. The annular combustion chamber casing 56 has a flange 55 at an upstream end and a flange 57 at a downstream end which are fastened to an adjacent compressor casing (not shown) and an adjacent turbine casing (not shown) respectively via suitable fasteners, e.g. nuts, bolts and washers. A plurality of circumferentially spaced fuel injectors 58 are arranged to supply fuel into the annular combustion chamber 15 and a fuel manifold 60 is arranged to supply fuel to each of the fuel injectors 58. Each fuel injector 58 has a fuel feed arm 62 extending through a corresponding one of a plurality of circumferentially spaced apertures 64 in the annular combustion chamber casing 56. Each fuel feed arm 62 is located in an associated sealing plate 65 which is secured onto the annular combustion chamber casing 56 by suitable fasteners, e.g. bolts. The fuel injectors 58 and apertures 64 are equi-circumferentially spaced around the annular combustion chamber casing 56.

Figure 3:
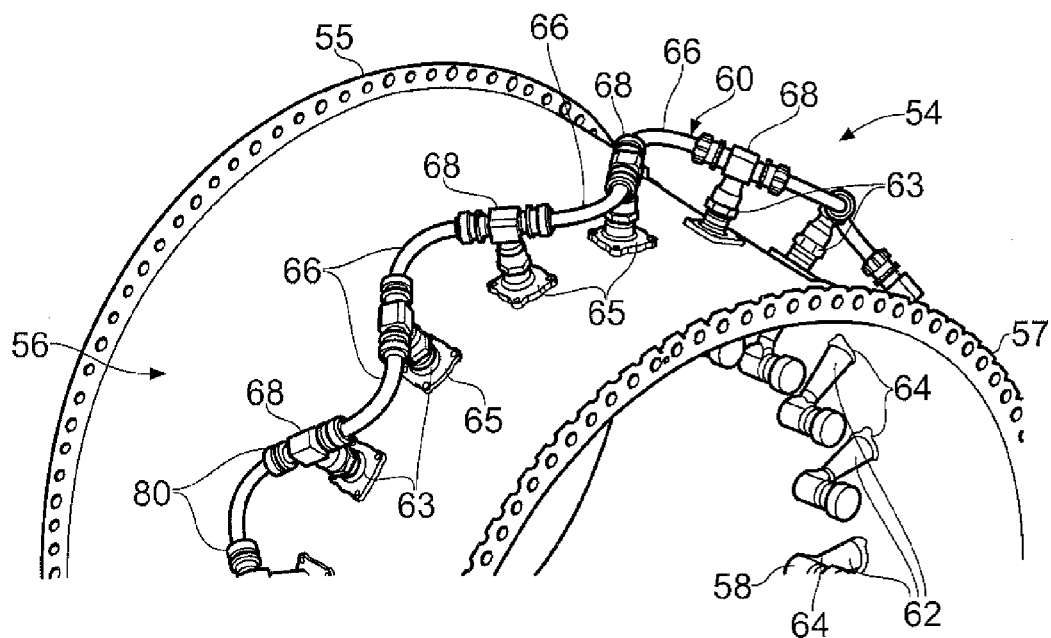
FIG. 3 is an enlarged perspective view of a fuel manifold and fuel injector arrangement for a combustion chamber according to the present invention and shown in FIG. 1.
Figure 4:
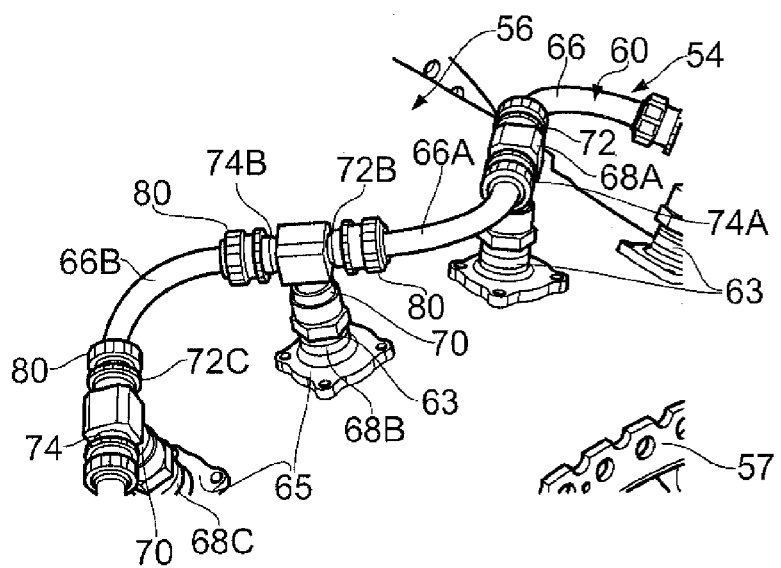
FIG. 4 is a further enlarged perspective view of a fuel manifold and fuel injector arrangement for a combustion chamber according to the present invention and shown in FIG. 1.
Figure 5:
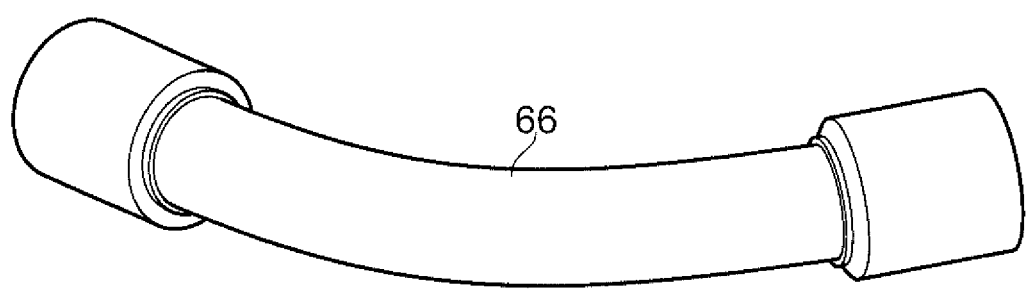
FIG. 5 is an enlarged perspective view of a fuel pipe used in the fuel manifold and fuel injector arrangement for a combustion chamber according to the present invention shown in FIGS. 3 and 4.
Figure 6:
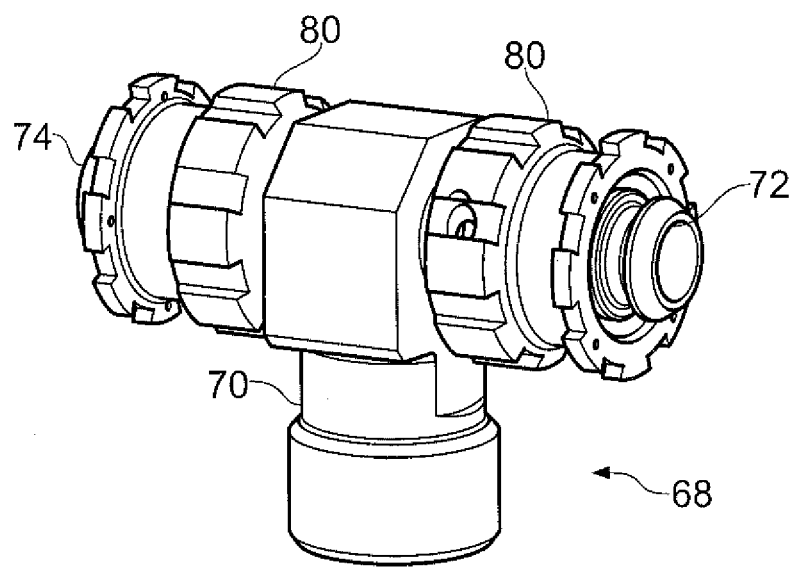
FIG. 6 is an enlarged perspective view of a T piece connector and associated lock nuts used in the fuel manifold and fuel injector arrangement for a combustion chamber according to the present invention shown in FIGS. 3 and 4.
Figure 7:
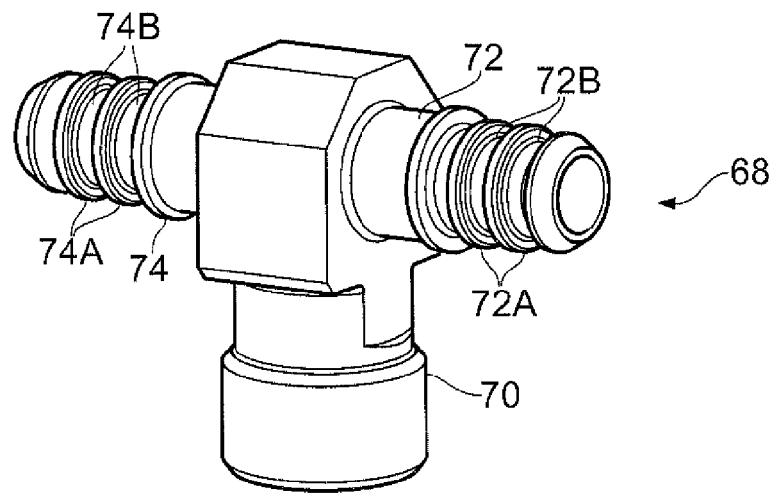
FIG. 7 is another enlarged perspective view of a T piece connector used in the fuel manifold and fuel injector arrangement for a combustion chamber according to the present invention shown in FIGS. 3 and 4.
Figure 8:
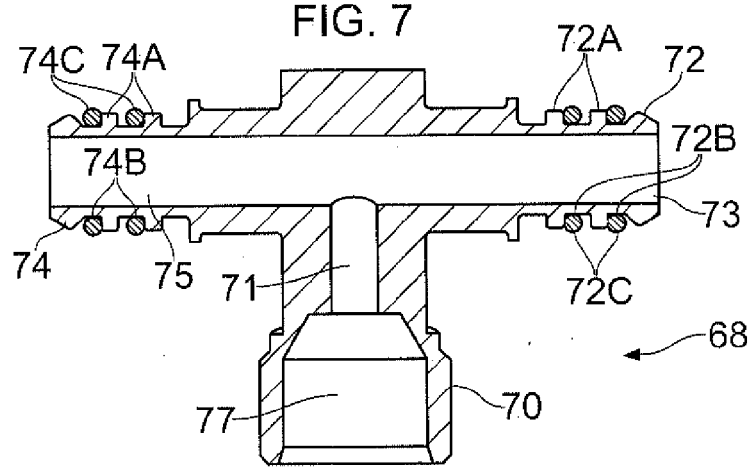
FIG. 8 is a cross-sectional view through the T piece connector shown in FIGS. 6 and 7.
Figure 9:
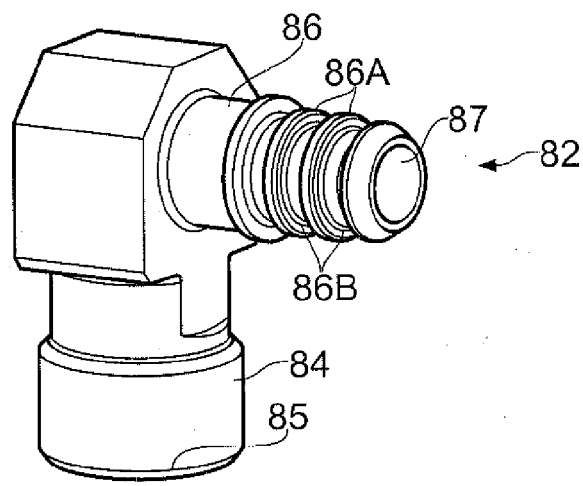
FIG. 9 is an enlarged perspective view of an L piece connector used in the fuel manifold and fuel injector arrangement for a combustion chamber according to the present invention shown in FIGS. 3 and 4.

The fuel manifold 60 comprises a plurality of flexible fuel pipes 66 and a plurality of T piece connectors 68 as shown in FIGS. 3 and 4. Each T piece connector 68, as shown more clearly in FIGS. 6 to 8, comprises a stem 70 and two parallel arms 72 and 74 extending in opposite directions from the stem 70. The stem 70 and the arms 72 and 74 of each T piece connector 68 are hollow and have fuel passages 71, 73 and 75 respectively for the flow of fuel, as shown in FIG. 8. The stem 70 of each T piece connector 68 is mounted on an outer end 63 of a respective one of the fuel feed arms 62. One of the flexible fuel pipes 66 interconnects an arm 72 of one T piece connector 68 with an arm 74 of an adjacent T piece connector 68. Fuel is supplied along and through each flexible fuel pipe 66 and into the arm 74 of a T piece connector 68 and some of the fuel is supplied through the stem 70 of the T piece connector 68 into the fuel feed arm 62 of the associated fuel injector 58 and the remainder of the fuel is supplied through the arm 72 of the T piece connector 68 into the next flexible fuel pipe 66 to be delivered to the adjacent T piece connector 68, or an adjacent L piece connector 82, see below, and the fuel feed arm 62 of the associated fuel injector 58.

Each flexible fuel pipe 66 comprises a braided hose capable of operating at high temperatures and capable of tolerating thermal expansion of the gas turbine engine components and tolerating vibrations of the gas turbine engine. Each flexible fuel pipe 66 comprises several coaxial layers for example an inner polytetrafluoroethylene (PTFE) layer, a braided layer, an insulation layer and an outer braided layer. However, other suitable flexible fuel pipes may be used.

Thus, it is seen in FIG. 4 that the three consecutive T piece connectors 68A, 68B and 68C are arranged such that the arms 74A and 72B of the T piece connectors 68A and 68B face in an upstream direction but face in opposite circumferential directions and towards each other. The arms 74B and 72C of the T piece connectors 68B and 68C face in a downstream direction but face in opposite circumferential directions and towards each other. The interconnecting flexible fuel pipe 66A is arcuate and its ends are connected to the arms 74A and 72B of the T piece connectors 68A and 68B respectively. The flexible fuel pipe 66A initially extends from the arm 74A of the T piece connector 68A with components in an upstream direction and a circumferential direction to a position where it reaches a maximum upstream position and then the flexible fuel pipe 66A extends with components in a downstream direction and a circumferential direction to the arm 72B of the T piece connector 68B. The flexible fuel pipe 66B initially extends from the arm 74B of the T piece connector 68B with components in a downstream direction and a circumferential direction to a position where it reaches a maximum downstream position and then the flexible fuel pipe 66B extends with components in an upstream direction and a circumferential direction to the arm 72C of the T piece connector 68C. Thus, the fuel manifold 60 is sinusoidal in that the flexible fuel pipes 66 and T piece connectors 68 are arranged such that the fuel manifold 60 extends sequentially between alternate positions of maximum upstream position and downstream direction circumferentially around the annular combustion chamber casing 56.

Figure 11:
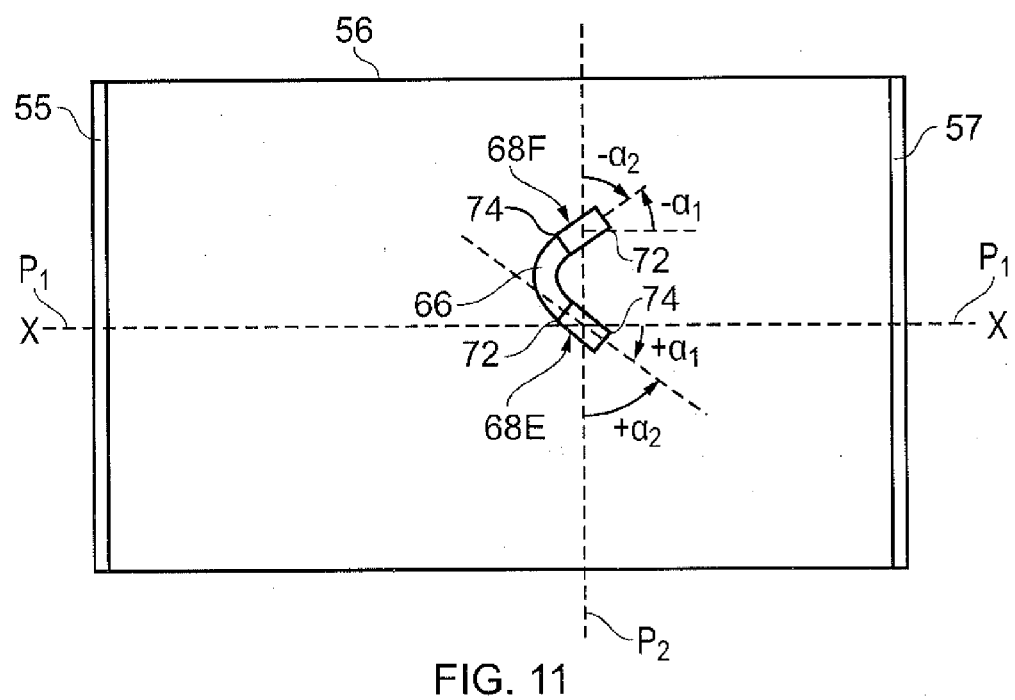
FIG. 11 is a plan view of the fuel manifold and fuel injector arrangement for a combustion chamber shown in FIG. 1.

Each T piece connector 68E, 68F is arranged such that the arms 72 and 74 are arranged at an angle $\alpha_1$ relative to a plane $P_1$ containing the axis X of the annular combustion chamber casing 56, and also the axes of the annular combustion chamber 15 and the gas turbine engine 10, and at an angle $\alpha_2$ to a plane $P_2$ perpendicular to the axis X of the annular combustion chamber casing 56, and also the axes of the annular combustion chamber 15 and the gas turbine engine 10, as shown in FIG. 11. In addition adjacent T piece connectors 68 are arranged at opposite angles, for example the arms 72 and 74 of T piece connector 68E define an angle of $+\alpha_1$ and $+\alpha_2$ with the planes $P_1$ and $P_2$ respectively whereas the arms 72 and 74 of the adjacent T piece connector 68F define angles $-\alpha_1$ and $-\alpha_2$ $_{with}$ the planes $P_1$ and P2 respectively such that the fuel manifold 60 extends around the combustion chamber casing 56 sinusoidally.

The arms 72 and 74 of the T piece connectors 68 are typically arranged an angle $\alpha_2$ of 15° to 75° to the plane $P_2$ perpendicular to the axis X of the annular combustion chamber casing 56. The arms 72 and 74 of the T piece connectors 68 may be arranged more broadly at an angle $\alpha_2$ of 10° to 90° to the plane $P_2$ perpendicular to the axis X of the annular combustion chamber casing 56. The arms 72 and 74 of the T piece connectors 68 are preferably arranged at an angle $\alpha_2$ of 30° to 60° to the plane $P_2$ perpendicular to the axis X of the annular combustion chamber casing 56. It is preferred that all of the T piece connectors 68 are arranged such that the arms 72 and 74 are arranged at an angle $\alpha_2$ of the same magnitude. In this example all of the T piece connectors 68 are arranged such that the arms 72 and 74 are arranged at an angle $\alpha_1$ of 45° to the plane $P_1$ containing the axis X of the annular combustion chamber casing 56 and at an angle $\alpha_2$ of 45° to the plane $P_2$ perpendicular to the axis X of the annular combustion chamber casing 56. The parallel arms 72 and 74 of the T piece connector 68 are arranged coaxially in this example.

Alternatively the T piece connectors 68 may be arranged such that the arms 72 and 74 are arranged at angles $\alpha_2$ of different magnitudes. The T piece connectors 68 may be arranged such that the arms 72 and 74 are parallel but the arms 72 and 74 are at different longitudinal positions, different radial positions with respect to the annular combustion chamber casing 56, on the stem 70. The T piece connectors 68 may be arranged such that the arms 72 and 74 are parallel and are at the same longitudinal position, same radial position, but the arms 72 and 74 are at different lateral positions, e.g. are arranged side by side. The T piece connectors 68 may be arranged such that the arms 72 and 74 are parallel, but the arms 72 and 74 are at different radial positions with respect to the annular combustion chamber casing 56, on the stem 70 and the arms 72 and 74 are at different lateral positions.

The radially outer ends 63 of the fuel feed arms 62 are circular in cross-section and the stems 70 of the T piece connectors 68 are circular in cross-section and the stems 70 of the T piece connectors 68 locate on and sealingly engage with the radially outer ends 63 of the fuel feed arms 63 to supply fuel into the respective fuel injectors 58. Similarly the arms 72 and 74 of the T piece connectors 68 are circular in cross-section and the ends of the flexible fuel pipes 66 are circular in cross-section and the arms 72 and 74 of the T piece connectors 68 locate on and sealingly engage with the ends of the flexible fuel pipes 66. Each end of a flexible fuel pipe 66 extends through a respective lock nut 80. The lock nuts 80 are threaded on their internal surfaces and the ends of the flexible fuel pipes 66 are threaded on their external surfaces such that the ends of the flexible fuel pipes 66 are threaded into the lock nuts 80 and located onto the arms 72 and 74 of the adjacent T piece connectors 68 to hold the flexible fuel pipe 66 securely to the respective T piece connector 68. The arms 72 and 74 of each T piece connector 68 have ridges 72A and 74A respectively which define annular grooves 72B and 74B to receive O-ring seals 72C and 74C respectively. The O-ring seals form a seal between the arms 72 and 74 and the inner surfaces of the ends of the flexible fuel pipes 68. Thrust wire locks (not shown) are also provided to hold the ends of the flexible fuel pipes 68 onto the T piece connectors 68. However, it may be possible to locate and seal the ends of the flexible fuel pipes 68 on the T piece connectors 68 using other suitable connectors.

As mentioned above the T piece connectors 68 are provided with fuel passages 71, 73 and 75 in the stem 70, arm 72 and arm 74 respectively, as shown in FIG. 8. The diameters of the fuel passages 73 and 75 in the arms 72 and 74 of the T pieces connector 68 are substantially the same and the same as the diameter of the passage in the flexible fuel pipes 66. The fuel passages 73 and 75 in the arms 72 and 74 of the T piece connector 68 are aligned, preferably coaxial, and merge together so that the fuel passage extends continuously through the T piece connector 68. The fuel passage 71 extends, e.g. perpendicularly, from the fuel passages 73, 75 in the arms 72 and 74 and the diameter of the fuel passage 71 is less than the diameter of the fuel passages 73 and 75 to form a suitable restrictions to control the flow of fuel, e.g. to increase the pressure, from the fuel manifold 60 into the associated fuel injector 58.

The fuel manifold 60 also has two L piece connectors 82 positioned at opposite ends of the fuel manifold 60. Each L piece connector 82, as shown more clearly in FIG. 9, comprises a stem 84 and a single arm 86 extending from the stem 84. The stem 84 and the arm 86 of each L piece connector 82 are hollow and have fuel passages 85 and 87 respectively for the flow of fuel. The stem 82 of each L piece connector 82 is mounted on an outer end 63 of a respective one of the fuel feed arms 62. Two of the flexible fuel pipes 66, one at each end of the fuel manifold 60, interconnect an arm 72 or 74 of the T piece connector 68 with the arm 86 of the adjacent L piece connector 82. Fuel is supplied along and through this flexible fuel pipe 66 and into the arm 86 of the L piece connector 82 and the fuel is supplied through the stem 84 of the L piece connector 82 into the fuel feed arm 62 of the associated fuel injector 58. The diameters of the fuel passages 87 in the arms 86 of the L piece connectors 82 are substantially the same and the same as the diameter of the passages in the flexible fuel pipes 66. The fuel passages 85 extend, e.g. perpendicularly, from the fuel passages 87 in the arms 86 and the diameters of the fuel passages 85 is less than the diameters of the fuel passages 87 to form a suitable restrictions to control the flow of fuel, e.g. to increase the pressure, from the fuel manifold 60 into the associated fuel injector 58. The arms 86 of the L piece connectors 82 are also arranged at an angle $\alpha_1$ relative to a plane $P_1$ containing the axis X of the annular combustion chamber casing 56 and at an angle $\alpha_2$ to a plane $P_2$ perpendicular to the axis X of the annular combustion chamber casing 56. The arm 86 of each L piece connector 82 has ridges 86A which define annular grooves 86B to receive O-ring seals (not shown). The O-ring seals form a seal between the arm 86 and the inner surface of the end of a flexible fuel pipe 68. The end of the flexible fuel pipe 68 extends through a respective lock nut 80. The lock nut 80 is threaded on its internal surface and the end of the flexible fuel pipe 66 is threaded on its external surface such that the end of the flexible fuel pipe 66 is threaded into the lock nut 80 and located onto the arm 86 the L piece connector 82 to hold the flexible fuel pipe 66 securely to the L piece connector 82. Again a thrust wire lock (not shown) is provided to hold the end of the flexible fuel pipe 68 onto the L piece connector 82.

The apertures 64 in the combustion chamber casing 56 are arranged substantially in the plane $P_2$ perpendicular to the axis X of the combustion chamber casing 56, combustion chamber 15 and turbofan gas turbine engine 10. The stems 70 of the T piece connectors 68 are also arranged substantially in the plane $P_2$ perpendicular to the axis X of the combustion chamber casing 56, combustion chamber 15 and turbofan gas turbine engine 10. The stems 84 of the L piece connectors 82 are also arranged substantially in the plane $P_2$ perpendicular to the axis X of the combustion chamber casing 56, combustion chamber 15 and turbofan gas turbine engine 10. Thus the stems 70 and 84 of the T piece and L piece connectors 68 and 82 are arranged at the "zero crossing points" of the sinusoidal fuel manifold 60.

Figure 10:
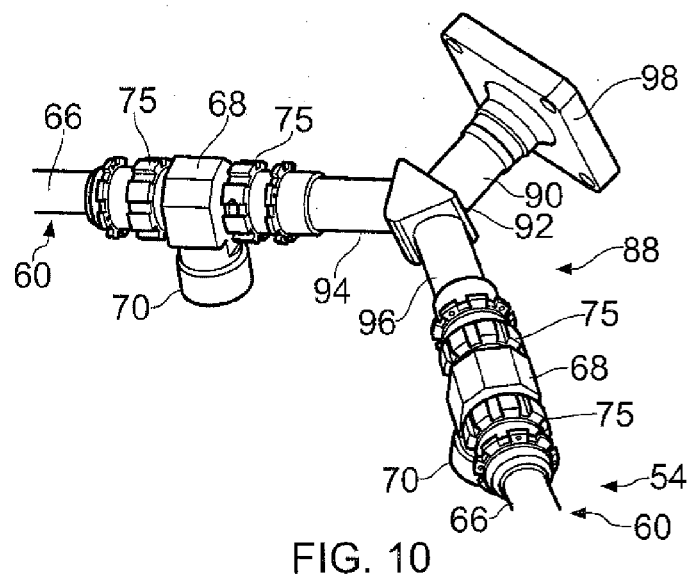
FIG. 10 is a perspective view of a Y piece connector used in the fuel manifold and fuel injector arrangement for a combustion chamber according to the present invention shown in FIGS. 3 and 4.

The fuel manifold 60 also has a single Y piece fuel inlet 88, as shown in FIG. 10. The Y piece fuel inlet 88 is mounted on the annular combustion chamber casing 56 by one or more brackets. The Y piece inlet 88 comprises a stem 90, splitter 92 and two arms 94 and 96 extending from the splitter 92 and stem 90. The stem 90, the splitter 92 and the arms 94 and 96 of the Y piece inlet 88 are hollow and have fuel passages, not shown, for the flow of fuel. The stem 90 of the Y piece inlet 88 is connected to a fuel supply via a plate 98 which is fastened, e.g. bolted, to a fuel filter and the fuel pump for the fuel supply. The arm 94 of the Y piece inlet 88 is interconnected to an arm 72 or 74 of a T piece connector 68 and secured by a lock nut 75 and similarly the arm 96 of the Y piece inlet 88 is interconnected to an arm 72 or 74 of a T piece connector 68 and secured by a lock nut 75. Fuel is supplied along the arms 94 and 96 of the Y piece inlet 88 into the arms 72 or 74 of the two T piece connectors 68 to supply fuel to the fuel feed arms 62 of all of the fuel injectors 58 via the respective T piece connectors 68, flexible fuel pipes 66 and L piece connectors 82. Thus the arm 94 of the Y piece inlet 92 supplies fuel to one half of the fuel manifold 60 and the arm 96 of the Y piece inlet 92 supplies fuel to the other half of the fuel manifold 60. The Y piece inlet 92 enables both halves of the fuel manifold 60 to be supplied with fuel at the same time with equal amounts of fuel. The fuel manifold 60 is substantially horseshoe in shape.

The fuel manifold and fuel injector arrangement 54 is preferably arranged such that the L piece connectors 82 are arranged at the vertically upper half of the annular combustion chamber casing 56 and adjacent to the top dead centre position and the Y piece inlet 92 is arranged at the vertically lower half of the annular combustion chamber casing 56 and adjacent to the bottom dead centre position. The provision of the L piece connectors 82 at the top dead centre position dispenses with a flexible fuel pipe and eliminates any possibility of coking occurring in a fuel pipe of a fuel manifold at this position due to natural thermal convection to the upper half of the annular combustion chamber casing 56. However, it may be possible to provide the L piece connectors 82 and Y piece inlet 92 at positions other than top dead centre and bottom dead centre respectively.

All the T piece connectors 68 are identical, both of the L piece connectors 82 are identical and all of the flexible fuel pipes 66 are identical and thus these components may be used interchangeably at any equivalent position.

Figure 12:
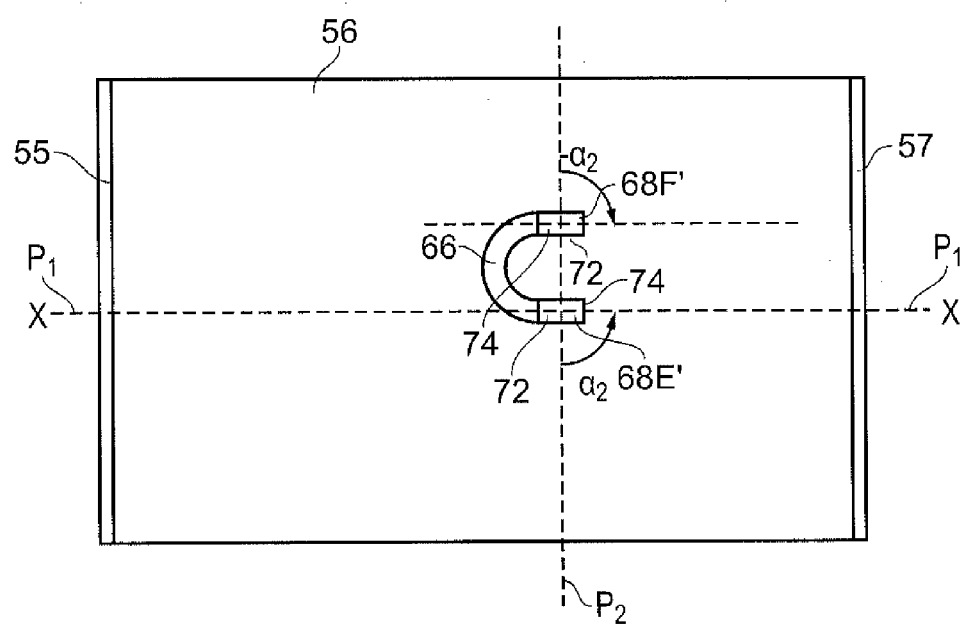
FIG. 12 is a plan view of a further fuel manifold and fuel injector arrangement for a combustion chamber shown in FIG. 1.

FIG. 12 shows another arrangement in which each T piece connector 68E', 68F' is arranged such that the arms 72 and 74 are arranged at an angle $\alpha_1$ of 0° relative to a plane $P_1$ containing the axis X of the annular combustion chamber casing 56, and also the axes of the annular combustion chamber 15 and the gas turbine engine 10, and at an angle $\alpha_2$ of 90° to a plane $P_2$ perpendicular to the axis X of the annular combustion chamber casing 56, and also the axes of the annular combustion chamber 15 and the gas turbine engine 10 such that the fuel manifold 60 extends around the combustion chamber casing 56 sinusoidally. This embodiment of the present invention has the advantage, compared to the other embodiments of the present invention, that it is easier to secure the flexible fuel pipes onto the T piece connectors, but it has the disadvantage that the flexible fuel pipes are longer and heavier.

Figure 13:
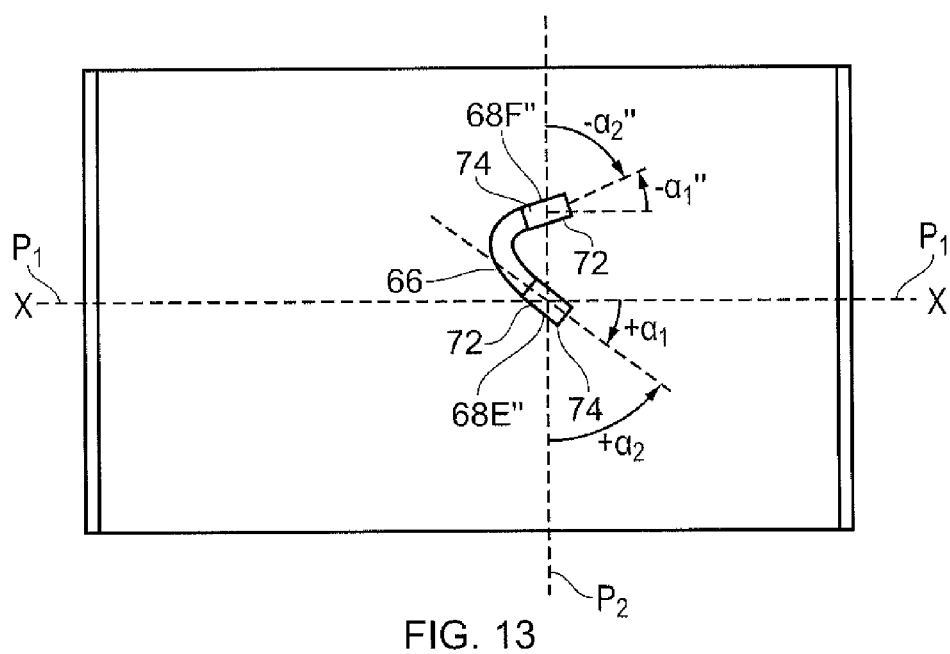
FIG. 13 is a plan view of the fuel manifold and fuel injector arrangement for a combustion chamber shown in FIG. 1.

FIG. 13 shows another arrangement in which each T piece connector 68E", 68F" is arranged such that the arms 72 and 74 are arranged at an angle $\alpha_1$ relative to a plane $P_1$ containing the axis X of the annular combustion chamber casing 56, and also the axes of the annular combustion chamber 15 and the gas turbine engine 10, and at an angle $\alpha_2$ to a plane $P_2$ perpendicular to the axis X of the annular combustion chamber casing 56, and also the axes of the annular combustion chamber 15 and the gas turbine engine 10. In addition adjacent T piece connectors 68E", 68F" are arranged at opposite angles, for example the arms 72 and 74 of T piece connector 68E" define an angle of +$\alpha_1$ and +$\alpha_2$ with the planes $P_1$ and $P_2$ respectively whereas the arms 72 and 74 of the adjacent T piece connector 68F" define angles -$\alpha_1$" and -$\alpha_2$" with the planes $P_1$ and P2 respectively such that the fuel manifold 60 extends around the combustion chamber casing 56 sinusoidally. It is also to be noted that the angle -$\alpha_1$ has a different magnitude, is less in magnitude, than angle $\alpha_1$ and that the angle -$\alpha_2$ has a different magnitude, is greater in magnitude, than angle $\alpha_2$.

Although the present invention has been described with reference to an annular combustion chamber, the present invention is also applicable to a combustion chamber arrangement comprising a plurality of circumferentially spaced tubular combustion chambers arranged in a tuboannular arrangement or to a plurality of separate circumferentially spaced tubular combustion chambers arranged in an annulus.

Although the present invention has been described with reference to a gas turbine engine combustion chamber it may be applicable to other combustion chambers.

An advantage of the present invention is that the fuel manifold is flexible and is able to accommodate differences in thermal expansion and contraction between the fuel manifold and the annular combustion chamber casing. The fuel manifold is flexible and is also able to accommodate vibration. The sinusoidal nature of the fuel manifold, e.g. the combination of the arcuate flexible fuel pipes between the angled T piece connectors provide the fuel manifold with this flexibility.

A further advantage of the present invention is that rigid fuel supply pipes from the fuel manifold to the fuel injector of the previously discussed prior art have been dispensed with and hence the problem of cracking in these fuel supply pipes has been overcome. In addition the present invention has reduced the number of components, or parts, of the fuel manifold and fuel injector arrangement, and reduced the weight and cost of the fuel manifold and fuel injector arrangement. The number of brackets, clips, wear sleeves, bolts and washers has been reduced and in particular no brackets are required to support the flexible fuel pipes on the annular combustion chamber casing because each flexible fuel pipe is supported by two T piece connectors or by one T piece connector and an L piece connector. The time for assembling the fuel manifold and fuel injector arrangement has been reduced and the time for disassembling and reassembling the fuel manifold and fuel injector arrangement for repairing or replacement of a fuel injector has also been reduced. The angling of the T piece and L piece connectors enables the flexible fuel pipes to be more easily fitted onto and/or removed from the arms of the T piece and L piece connectors.

It may be possible to use flexible fuel pipes with different lengths if the circumferential spacing between the adjacent fuel injectors/apertures in the combustion chamber casing is not the same. The fuel pipes may be flexible along their full lengths or the mid-portions of the fuel pipes may be flexible.

The present invention has been described with reference to a fuel manifold supplying fuel to rich burn fuel injectors, e.g. fuel injectors having a single fuel spray nozzle or a single fuel prefilmer.

However, the present invention may also be used with a fuel manifold supplying fuel to lean burn fuel injectors, e.g. fuel injectors having a pilot fuel spray nozzle and a main fuel spray nozzle, a pilot fuel prefilmer and a main fuel prefilmer or a pilot fuel spray nozzle and a main fuel prefilmer. The fuel manifold in this example would comprise flexible fuel pipes with two fuel passages and T piece connectors and L piece connectors with two fuel passages, e.g. the fuel passages in the fuel pipes may be coaxial with the main fuel flowing through the inner fuel passage.

Although the present invention has been described with reference to a turbofan gas turbine engine it may be equally applicable to other aircraft gas turbine engines, e.g. a turbojet gas turbine engine, a turboprop gas turbine engine or a turboshaft gas turbine engine. The present invention is equally applicable to marine, automotive and industrial gas turbine engines.

The invention claimed is:
1. A fuel manifold and fuel injector arrangement for supplying fuel to at least one combustion chamber comprising
an annular combustion chamber casing arranged around the at least one combustion chamber, a plurality of circumferentially spaced fuel injectors arranged to supply fuel into the at least one combustion chamber, each fuel injector having a fuel feed arm extending through a corresponding aperture in the annular combustion chamber casing, a fuel manifold arranged to supply fuel to each of the fuel injectors, the fuel manifold comprising a plurality of flexible fuel pipes and a plurality of T piece connectors, each T piece connector comprising a stem and two parallel arms extending in opposite directions from the stem, the stem of each T piece connector being mounted on an outer end of a respective one of the fuel feed arms, each flexible fuel pipe interconnecting an arm of one T piece connector with an arm of an adjacent T piece connector, each T piece connector being arranged so that the adjacent arms of two adjacent T pieces are both angled inwards towards or both an led outwards from a plane perpendicular to the axis of the annular combustion chamber casing such that the fuel manifold extends around the combustion chamber casing sinusoidally.

2. A fuel manifold and fuel injector arrangement as claimed in claim 1 wherein each T piece connector being arranged such that the arms are arranged at an angle relative to a plane containing the axis of the annular combustion chamber casing and at an angle relative to a plane perpendicular to the axis of the annular combustion chamber casing and adjacent T piece connectors being arranged at opposite angles such that the fuel manifold extends around the combustion chamber casing sinusoidally.

3. A fuel manifold and fuel injector arrangement as claimed in claim 1 wherein the arms of the T piece connectors being arranged at an angle of 10° to 90° to the plane perpendicular to the axis of the annular combustion chamber casing.

4. A fuel manifold and fuel injector arrangement as claimed in claim 1 wherein the arms of the T piece connectors being arranged at an angle of 30° to 60° to the plane perpendicular to the axis of the annular combustion chamber casing.

5. A fuel manifold and fuel injector arrangement as claimed in claim 1 wherein all of the T piece connectors being arranged such that the arms are arranged at an angle of the same magnitude.

6. A fuel manifold and fuel injector arrangement as claimed in claim 1 wherein the T piece connectors being arranged such that the arms are arranged at angles of different magnitudes.

7. A fuel manifold and fuel injector arrangement as claimed in claim 1 wherein all of the T piece connectors being arranged such that the arms are arranged at an angle of 45° to the plane containing the axis of the annular combustion chamber casing and at an angle of 45° to the plane perpendicular to the axis of the annular combustion chamber casing.

8. A fuel manifold and fuel injector arrangement as claimed in claim 1 wherein the parallel arms of the T piece connector being arranged coaxially.

9. A fuel manifold and fuel injector arrangement as claimed in claim 1 comprising two L piece connectors, each L piece connector being arranged at a respective end of the fuel manifold, each L piece connector comprising a stem and an arm extending from the stem, the stem of each L piece connector being mounted on an outer end of a respective one of the fuel feed arms and one of the flexible fuel pipes interconnecting an arm of one T piece connector with an arm of an adjacent L piece connector.

10. A fuel manifold and fuel injector arrangement as claimed in claim 9 wherein the L piece connectors being arranged at an upper half of the annular combustion chamber casing.

11. A fuel manifold and fuel injector arrangement as claimed in claim 9 comprising a fuel inlet connector, the fuel inlet connector being interconnected with an arm of a T piece connector.

12. A fuel manifold and fuel injector arrangement as claimed in claim 11 wherein the fuel inlet connector being interconnected with an arm of a further T piece connector.

13. A fuel manifold and fuel injector arrangement as claimed in claim 11 wherein the fuel inlet connector being arranged at a lower half of the annular combustion chamber casing.

14. A fuel manifold and fuel injector arrangement as claimed in claim 1 wherein the at least one combustion chamber being an annular combustion chamber.

15. A fuel manifold and fuel injector arrangement as claimed in claim 1 wherein the at least one combustion chamber is a gas turbine engine combustion chamber.

16. A fuel manifold and fuel injector arrangement as claimed in claim 15 wherein the gas turbine engine is selected from the group consisting of an aero gas turbine engine, a marine gas turbine engine and an industrial gas turbine engine.

17. A fuel manifold and fuel injector arrangement as claimed in claim 1 wherein fuel injectors are lean burn fuel injectors, the fuel manifold comprising flexible fuel pipes having two fuel passages and the T piece connectors having two fuel passages.

18. A fuel manifold and fuel injector arrangement as claimed in claim 17 wherein the lean burn fuel injectors are selected from the group consisting of lean burn fuel injectors having a pilot fuel spray nozzle and a main fuel spray nozzle, lean burn fuel injectors having a pilot fuel prefilmer and a main fuel prefilmer and lean burn fuel injectors having a pilot fuel spray nozzle and a main fuel prefilmer.

19. A fuel manifold and fuel injector arrangement as claimed in claim 17 wherein fuel passages in the fuel pipes being coaxial and the main fuel flowing through an inner fuel passage.

20. A fuel manifold and fuel injector arrangement for supplying fuel to at least one combustion chamber comprising an annular combustion chamber casing arranged around the at least one combustion chamber, a plurality of circumferentially spaced fuel injectors arranged to supply fuel into the at least one combustion chamber, each fuel injector having a fuel feed arm extending through a corresponding aperture in the annular combustion chamber casing, a fuel manifold arranged to supply fuel to each of the fuel injectors, the fuel manifold comprising a plurality of flexible fuel pipes and a plurality of T piece connectors, each T piece connector comprising a stem and two parallel arms extending in opposite directions from the stem, the stem of each T piece connector being mounted on an outer end of a respective one of the fuel feed arms, each flexible fuel pipe interconnecting an arm of one T piece connector with an arm of an adjacent T piece connector, each T piece connector being arranged so that the adjacent arms of two adjacent T pieces are both angled inwards towards or both angled outwards from a plane perpendicular to the axis of the annular combustion chamber casing such that the fuel manifold extends around the combustion chamber casing sinusoidally, the fuel manifold additionally comprising two L piece connectors, each L piece connector being arranged at a respective end of the fuel manifold, each L piece connector comprising a stem and an arm extending from the stem, the stem of each L piece connector being mounted on an outer end of a respective one of the fuel feed arms and one of the flexible fuel pipes interconnecting an arm of one T piece connector with an arm of an adjacent L piece connector, and the L piece connectors being arranged at an upper half of the annular combustion chamber casing.

* * * * *